United States Patent [19]

Valli

[11] Patent Number: 5,119,890
[45] Date of Patent: Jun. 9, 1992

[54] VIBRATION DAMPENED TABLE BUSHING ASSEMBLY FOR ROTARY DRILLING MACHINES

[75] Inventor: Robert F. Valli, Philipsburg, Pa.
[73] Assignee: Reichdrill, Inc., Philipsburg, Pa.
[21] Appl. No.: 561,543
[22] Filed: Jul. 23, 1990
[51] Int. Cl.$^5$ .............................................. F16C 27/06
[52] U.S. Cl. ...................................... 175/57; 175/220; 384/215
[58] Field of Search ............... 175/220, 211, 214, 203, 175/195, 162, 170; 384/215, 220, 536, 582

[56] References Cited

U.S. PATENT DOCUMENTS

| | | | |
|---|---|---|---|
| 3,944,300 | 3/1976 | Learmont et al. | 175/220 X |
| 4,186,973 | 2/1980 | Work | 175/220 X |
| 4,351,399 | 9/1982 | Lapointe | 175/220 X |
| 4,377,213 | 3/1983 | Bailey et al. | 175/220 X |
| 4,496,252 | 1/1985 | Horler et al. | 384/215 |
| 4,943,172 | 7/1990 | Waldrep | 175/220 X |

Primary Examiner—Stephen J. Novosad
Attorney, Agent, or Firm—Townsend and Townsend

[57] ABSTRACT

A table bushing is used with a rotary drilling machine of the type having a table through which a drill steel passes. The table bushing uses an automotive tire, or like resilient annular tube, to center the table bushing within an oversized hole in the table. The tire, the pressure of which can be varied according to the operating conditions, dampens vibrations generated while drilling under high thrust loads.

15 Claims, 2 Drawing Sheets

VIBRATION DAMPENED TABLE BUSHING ASSEMBLY FOR ROTARY DRILLING MACHINES

BACKGROUND OF THE INVENTION

The present invention relates to improvements in rotary drilling machines. In particular, it relates to the use of novel table bushing assemblies which dampen vibrations generated during drilling operations.

A drilling machine is a motor driven device with a rotating drill steel and an end cutting tool (the drill bit) that creates a hole in solid material. Drilling machines are used in a variety of applications. In earth drilling operations, such as water well drilling, the drill steel is stabilized at or near the ground surface by a concentric series of bushings in the drill table. A small, carefully measured, clearance is required between the drill steel and the innermost table bushing to allow rotation and movement of the drill steel. The contact between the drill steel and table bushing, however, causes wear to the bushing. As a result, the inner diameter of the bushing is enlarged and the clearance between the drill steel and the bushing is increased. The drill steel is thus inadequately stabilized and deflects or bows under high thrust loads. When the drill steel bows while turning, it hits against the bushing and causes vibrations in the drill table.

Under current designs, the vibrations generated by the drill steel are transmitted through the drill table to the main structure of the drilling machine causing physical damage to various components of the drill. In order to decrease or stop vibration, the drill operator must decrease the thrust load, change the speed of the drill steel, or completely stop the drilling operation. All of these adjustments decrease the productivity of the drilling machine.

SUMMARY OF THE INVENTION

The present invention provides a vibration dampening drill table bushing assembly for use in rotary drilling. The assembly thus prevents damage to the drilling machine caused by vibration generated by the drill steel. The vibrations are absorbed by a resilient ring which prevents the transmission of the vibrations to the rest of the drilling machine. Thus, the machine can operate at its highest production rate. Although the invention is described here in earth drilling operations, the present invention can be applied in any drilling application in which vibration generated by the drill steel is a problem.

To allow broad application, the inner wall of the assembly is formed to accommodate any standard sleeve-type or bearing-type table bushing available in the market place. The assembly will usually include a housing with a removable cover that allows the resilient ring to be mounted to the drill table. Due to the pressure provided by the resilient ring, the inner wall of the housing firmly supports the inserted table bushing so that the bushing properly stabilizes the drill steel.

The resilient ring of the present invention can be formed from any material, such as rubber, that provides sufficient resiliency to absorb vibration. Preferably the ring is a pressurized annular tube that expands and contracts according to the amount of pressurization. In the exemplified case, a standard automotive tire is used as the annular tube.

The pressure in the tube can be provided by any fluid. The tube is ideally filled with an inexpensive and commonly available material. For this reason, the preferred fluid is air. The tube may also be at least partly filled with a liquid, provided the tube provides sufficient resiliency for absorbing vibrations. Other possible materials to be used for filling the tube include various foams commonly available in the marketplace. For instance, foams used to fill tubes on vehicles used in underground mining operations may be used.

In addition, the tube will typically include means for varying the pressure so that different degrees of vibration can be accommodated. Thus, as vibration increases during the drilling operation, the pressure of the ring can be reduced to create a softer cushion which will absorb more vibration. If the annular tube is a tire tube filled with air, the pressure can easily be adjusted using the valve stem on the tire.

The present invention also provides methods of preventing damage to drilling machines by dampening the vibration of the drill steel and preventing the vibration to be transmitted to the drilling machine. The method comprises providing a drill table which includes a table bushing assembly having a pressurized annular tube for absorbing the vibration of the drill steel.

The primary advantage of the present invention is that the drilling machine can operate more efficiently because work need not be slowed or stopped to prevent damage to the drilling machine caused by vibration. Another advantage is that the invention can be adapted for use in most drilling machines relatively inexpensively. In addition, the housing is adapted to incorporate any conventional table bushings available in the marketplace.

Other features and advantages of the invention will appear from the following description in which the preferred embodiment has been set forth in detail in conjunction with the accompanying drawings.

DESCRIPTION OF THE PREFERRED EMBODIMENTS

Figure 1:
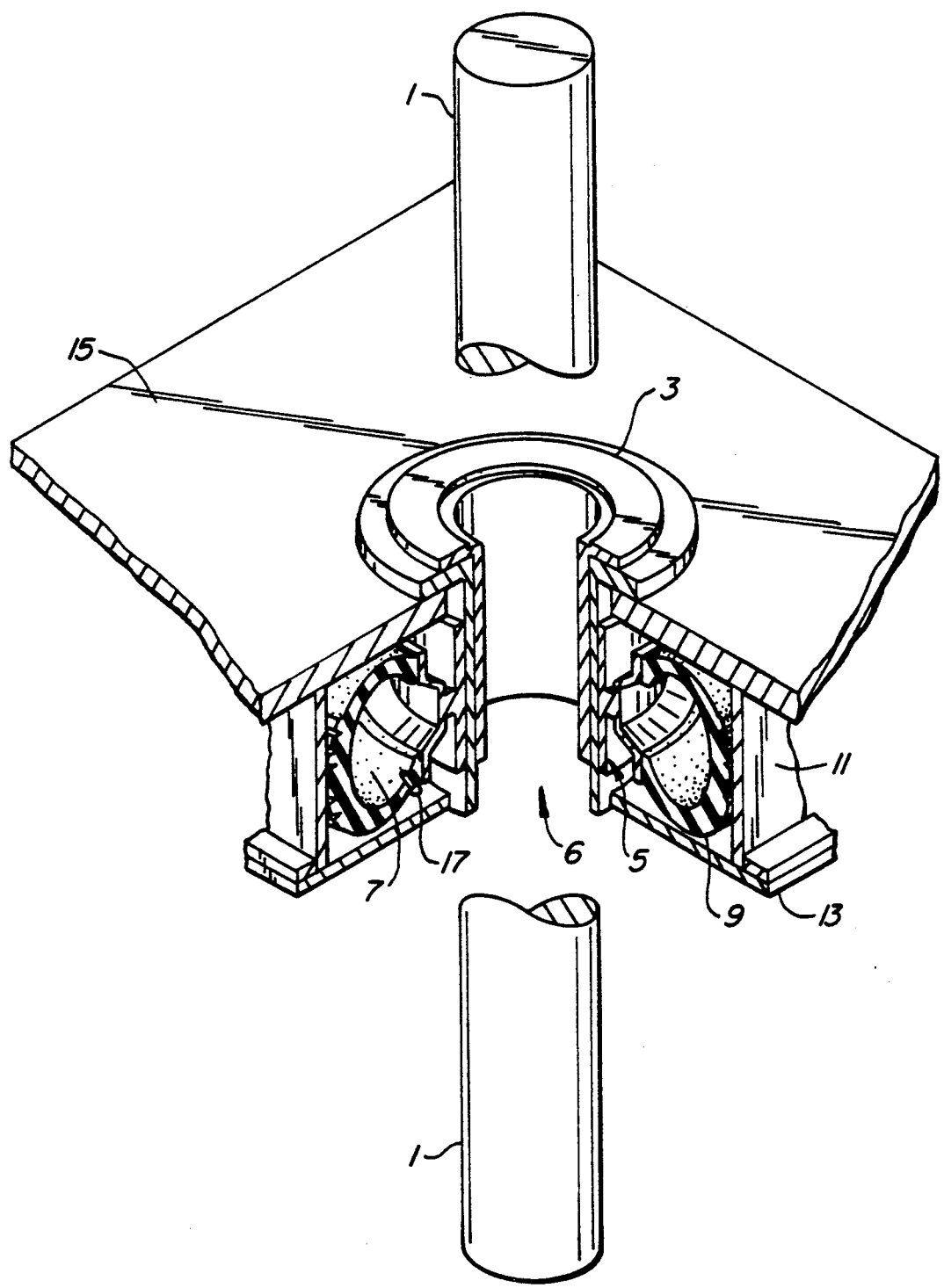
FIG. 1 is a quarter section - isometric view of a vibration dampened table bushing assembly of the present invention. For clarification, a portion of a mast table, drill steel and conventional drill steel sleeve type bushings are shown.
Figure 2:
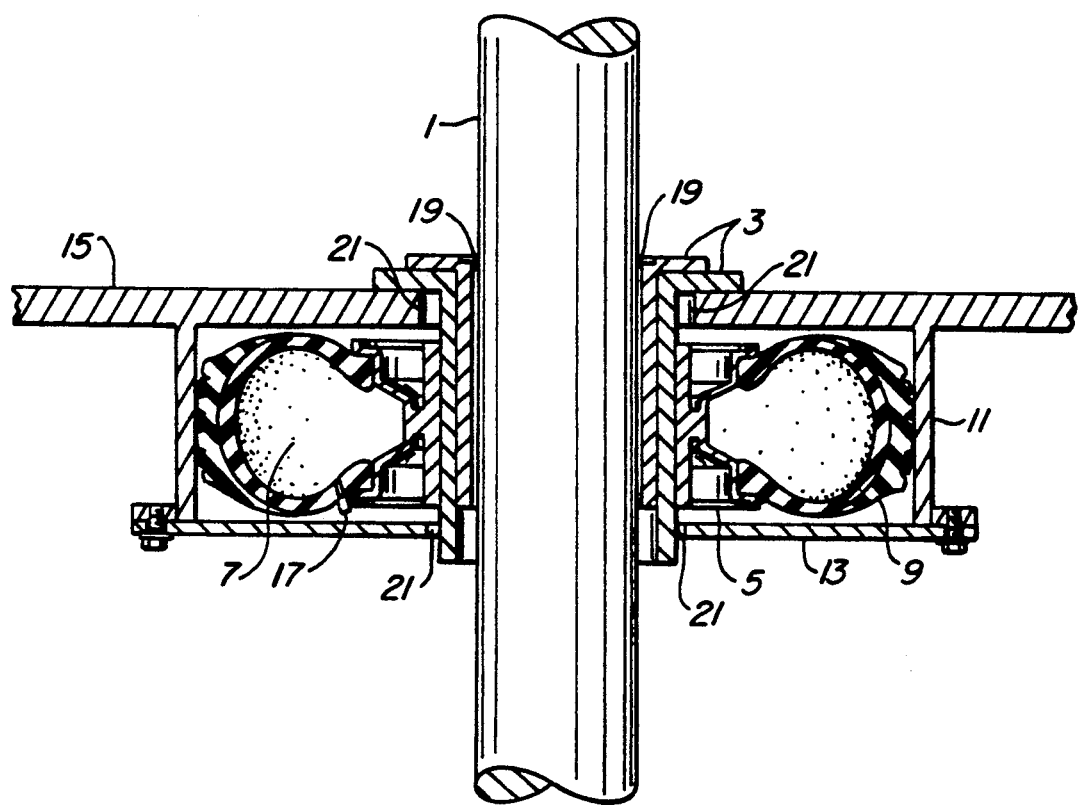
FIG. 2 is a full section view of the same apparatus.

Referring to FIGS. 1 and 2, it can be seen that the drill table 15 includes an outer housing 11 and removable cover 13 which are mounted to it. The outer housing 11 and removable cover 13 enclose a pressurized annular tube 9. The annular tube 9 is preferably a standard automotive tire. The pressure in the annular tube 9 is provided by a fluid 7, typically air. The pressurized annular tube 9 retains an inner housing 5 which firmly supports a series of concentric table bushings 3 which are inserted in an oversized hole 6 in the table 15. Typically two bushings are used. A clearance 19 is required between the drill steel 1 and the bushings 3.

During drilling operations, the drill steel 1 causes wear to the bushings 3. As a result, the clearance 19 between the drill steel 1 and the bushings 3 is increased which causes the drill steel 1 to deflect or bow under high radial thrust loads. Continued operation under these conditions causes a slapping action of the drill steel 1 against the table bushings 3. This vibration is transmitted to the inner housing 5 which is retained by the pressurized annular tube 9. A clearance 21 between the bushings and the drill table 13, 15 allows the pressurized annular tube 9 to compress and absorb the vibration produced. Thus, vibration is fully or substantially attenuated so as not to be transmitted to the drill table and other parts of the drilling machine.

A valve stem 17 is used to provide the variation in pressure of the annular tube 9. The valve 17 is used to decrease or increase pressure as required during the drilling operation. Generally, when the vibration occurs the pressure is varied to allow greater dampening effect. Other methods for varying the pressure, such as constricting tube 9, can be used as well.

While an embodiment of the invention has been illustrated, explained and described in detail, it is to be expressly understood that the invention is not limited thereto. Various changes in form, fit or function, design or arrangement may be made without departing from the spirit and scope of the invention. The invention is therefore claimed not only as shown, explained and described, but also in such forms and modifications thereof as might be reasonably construed to be within the spirit of the invention and the scope of the claims.

What is claimed is:

1. A table bushing assembly, for use with a rotary drilling machine of the type including a drill table and a drill steel passing through an oversized hole in the drill table, the table bushing assembly comprising:
   a continuous resilient ring positioned generally concentric with the oversized hole; and
   at least one bushing positioned within the oversized hole and passing through the resilient ring, the resilient ring sized and positioned to radially locate the bushing within the oversized hole so the resilient ring absorbs vibration from the drill steel.

2. A table bushing assembly of claim 1 wherein the resilient ring is a pressurized annular tube.

3. A table bushing assembly of claim 2 wherein the annular tube is filled with a fluid.

4. A table bushing assembly of claim 3 wherein the annular tube is filled with air.

5. A table bushing assembly of claim 3 wherein the annular tube is filled with a foam.

6. A table bushing assembly of claim 2 wherein the annular tube comprises means for varying the pressure of the tube.

7. A table bushing assembly of claim 7 wherein the annular tube is an automotive tire and the means for varying the pressure includes a valve stem.

8. A table bushing assembly of claim 1 further comprising a table bushing housing for mounting the resilient ring to the table, the table bushing housing having a removable cover.

9. A table bushing assembly of claim 1 wherein the drilling machine is used in earth drilling operations.

10. A method of preventing damage to a drilling machine caused by vibration of a drill steel, the method comprising:
    providing a drill table having an oversized hole;
    positioning a table bushing in the oversized hole;
    centering the table bushing within the oversized hole using a continuous resilient ring; and
    absorbing the vibration of the drill steel by the resilient ring.

11. A method of claim 10 wherein the resilient ring is a pressurized annular tube.

12. A method of claim 11 further comprising the step of filling the pressurized annular tube with foam.

13. A method of claim 11 further comprising the step of filling the pressurized annular tube with fluid.

14. A method of claim 11 further comprising the step of varying the pressure in the pressurized annular tube.

15. A table bushing assembly, for use with an earth drilling machine of the type including a drill table and a drill steel passing through an oversized hole in the drill table, the table bushing assembly comprising:
    a pneumatic tire mounted to the drill table concentric with the oversized hole;
    a bushing positioned within the oversized hole and passing through the tire for absorbing vibration of the drill steel and;
    the tire positioned in a housing mounted to the table to radially locate the bushing within the oversized hole.

* * * * *